United States Patent
Qiu et al.

(10) Patent No.: US 12,353,996 B2
(45) Date of Patent: Jul. 8, 2025

(54) FORECASTING WITH DEEP STATE SPACE MODELS

(71) Applicant: Robert Bosch GmbH, Stuttgart (DE)

(72) Inventors: Chen Qiu, Sindelfingen (DE); Maja Rita Rudolph, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 964 days.

(21) Appl. No.: 17/407,621

(22) Filed: Aug. 20, 2021

(65) Prior Publication Data

US 2022/0092415 A1 Mar. 24, 2022

(30) Foreign Application Priority Data

Sep. 24, 2020 (EP) .................................... 20198014
Sep. 28, 2020 (EP) .................................... 20198705

(51) Int. Cl.
*G06N 3/08* (2023.01)
*G06N 3/045* (2023.01)
*G06V 10/75* (2022.01)

(52) U.S. Cl.
CPC ............... *G06N 3/08* (2013.01); *G06N 3/045* (2023.01); *G06V 10/751* (2022.01)

(58) Field of Classification Search
CPC ......... G06N 3/08; G06N 3/045; G06V 10/751
See application file for complete search history.

(56) References Cited

U.S. PATENT DOCUMENTS

| | | | |
|---|---|---|---|
| 2019/0129044 A1* | 5/2019 | Chen | G01S 5/0294 |
| 2022/0019900 A1* | 1/2022 | Wong | G06N 3/084 |
| 2022/0070822 A1* | 3/2022 | Behboodi | G06N 3/045 |

FOREIGN PATENT DOCUMENTS

| | | | | |
|---|---|---|---|---|
| CA | 3081164 A1 * | 11/2020 | | G06N 3/04 |
| WO | WO-2010036456 A2 * | 4/2010 | | G06T 7/204 |
| WO | WO-2016145379 A1 * | 9/2016 | | G06N 3/0472 |

OTHER PUBLICATIONS

Ha et al. "world models", arXiv:1803.10122v4 [cs.LG] May 9, 2018. pp. 21.*

(Continued)

*Primary Examiner* — Li Wu Chang
(74) *Attorney, Agent, or Firm* — NORTON ROSE FULBRIGHT US LLP

(57) ABSTRACT

A computer-implemented method for training a deep state space model using machine learning. The deep state space model includes a generative model and a multi-modal inference model. The generative model includes a transition model, and an emission model. The method includes: a) receiving a training data set comprising a sequence of observation vectors. For a plurality of observation vectors, the method iterates between b), c), and d) in sequence: b) inferring, using the multi-modal inference model, a current latent state of the generative model; c) constructing, using the multi-modal inference model, a posterior approximation of the current latent state as a mixture density network. For a plurality of observation vectors comprised in the sequence of observation vectors, d) decoding, using the emission model, the plurality of approximated latent state vectors to provide a plurality of synthetic observations; and e) outputting the trained deep state space model.

19 Claims, 5 Drawing Sheets

(56) References Cited

OTHER PUBLICATIONS

Gedon, et al.: "Deep State Space Models for Nonlinear System Identification", arxiv.org, Cornell University Library, (2020), pp. 1-10, XP081634965.
Rangapuram, et al.: "Deep State Space Models for Time Series Forecast ing", 32nd Cinf. on Neural Informatin Processing Systems (NeurIPS 2018), Montreal, Canada, (2018), pp. 1-10, XP055788875.

* cited by examiner

FORECASTING WITH DEEP STATE SPACE MODELS

CROSS REFERENCE

The present application claims the benefit under 35 U.S.C. § 119 of European Patent Application EP 20198705.4 filed on Sep. 28, 2020, and European Patent Application EP 20198014.1 filed on Sep. 24, 2020, which are expressly incorporated herein by reference in their entireties.

FIELD

The present invention relates to a computer-implemented method for training a deep state space model using machine learning, and an associated method for using a trained machine learning model, an apparatus configured to train a deep state space model using machine learning, and associated computer program elements, and a computer readable medium.

BACKGROUND INFORMATION

The development and application of data-driven algorithms in technical systems is becoming increasingly important in digitization and especially in the automation of technical systems. A technical problem can often be reduced to obtaining the best possible knowledge and/or information about a future development of at least one time series, which is fed, for example, by at least one sensor. In technical systems it can be advantageous, on the one hand, to evaluate newly acquired data points to generate new data points and in particular a large number of new data points for the at least one time series. In this way, for example, various future scenarios can be simulated and statistically evaluated. The technical system can then be adapted or reconfigured as a function of simulated results based on the estimated continuation of the at least one time series.

For example, vehicle route prediction based upon the previously travelled route as a vehicle, future wireless network resource allocation based on past wireless network resource allocation, or future industrial machine performance based on past performance all fall within this topic area. A variational recurrent neural network (VRNN) combines a recursive neural network (RNN) with a variational auto encoder (VAE) to enable the generation of forecasts of technical systems. However, such approaches may be further improved.

SUMMARY

According to a first aspect of the present invention, there is provided a computer-implemented method for training a deep state space model using machine learning. The deep state space model comprises: a generative model and a multi-modal inference model. The generative model further comprises a transition model configured to describe a change of a plurality of latent states, and an emission model configured to decode the plurality of latent states to provide thereby a plurality of synthetic observations. In accordance with an example embodiment of the present invention, the method comprises:

a) receiving a training data set comprising a sequence of observation vectors each obtained at an observation step. For a plurality of observation vectors comprised in the sequence of observation vectors, the method iterates b), c), and d):

b) inferring, using the multi-modal inference model, a current latent state of the generative model by mapping a current observation vector obtained at a current observation step of the sequence of observation vectors to obtain a probability distribution of the current latent state;

c) constructing, using the multi-modal inference model, a posterior approximation of the current latent state as a mixture density network, to thus yield a plurality of approximated latent state vectors. For a plurality of observation vectors comprised in the sequence of observation vectors, the method further comprises:

d) decoding, using the emission model, the plurality of approximated latent state vectors to provide thereby a plurality of synthetic observations; and e) outputting the trained deep state space model.

An effect is that generative model of data generated by a multi-modal system can be learned based on a small number of initial observations. Accurate and plausible suggestions for the continuation of the small number of initial observations may be provided, even though the continuation is applicable to a multi-modal system. Such a computer-implemented method has wide application where a model system is subject to multi-modal biases. As one example, initial observations of the motion of a vehicle on a 2D grid may be elaborated into a large number of potential future routes on the 2D grid. Another example concerns the monitoring of engine modes in a motor vehicle, or the allocation of wireless network resources.

According to a second aspect of the present invention, there is provided a computer-implemented method for using a trained machine learning model. In accordance with an example embodiment of the present invention, the machine learning model is configured to receive, via an input unit, an input sequence of observation vectors each obtained at an observation step; and predict at least one continuation of the sequence of observation vectors, using the trained machine learning model; and output the at least one continuation of the sequence of observation vectors.

According to a third aspect of the present invention, there is provided an apparatus configured to train a deep state space model using machine learning. In accordance with an example embodiment of the present invention, the apparatus comprises an input interface, a memory, a processor, and an output interface.

The input interface is configured to receive a training data set comprising a sequence of observation vectors $(X_{1:T} = (X_1, \ldots, X_T))$ each obtained at an observation step.

The processor is configured to execute a deep state space model comprising a generative model and a multi-modal inference model, wherein, in use, the generative model further comprises a transition model configured to describe a change of a plurality of latent states, and an emission model configured to decode the plurality of latent states to provide thereby a plurality of synthetic observations.

The processor is further configured, for a plurality of observation vectors comprised in the sequence of observation vectors, to iterate (a) the inference, using the multi-modal inference model, of a current latent state of the generative model by mapping a current observation vector obtained at a current observation step of the sequence of observation vectors to obtain a probability distribution of the current latent state, and (b) the construction, using the multi-modal inference model, of a posterior approximation of the current latent state as a mixture density network, to thus yield a plurality of approximated latent state vectors, and for a plurality of observation vectors comprised in the sequence of observation vectors, the processor is configured to decode, using the emission model, the plurality of approximated latent state vectors to provide thereby a plurality of synthetic observations. The output interface is configured to output the plurality of synthetic observations.

According to a fourth aspect of the present invention, there is provided a computer program element comprising a program for training, using machine learning, a deep state space model on a training data set comprising a sequence of observation vectors $(X_{1:T}=(X_1, \ldots, X_T))$ each obtained at an observation step, wherein the computer program element, when executed by a computer, causes the computer to perform the steps of the first aspect and its embodiments.

According to a fifth aspect of the present invention, there is provided a computer program element comprising trained model data defining a deep state space model generated by a computer executing a computer-implemented method according to the first aspect and its embodiments.

According to a sixth aspect of the present invention, there is provided a computer readable medium comprising the computer program element of either of the fourth or fifth aspects.

Sequential data, of which one type is time series data, may in an example be obtained via sensor signals such as geospatial positioning system (GPS) signals of vehicles, or engine emission sensors. The accurate forecasting of typical driving behaviour, typical pollution levels over time, or of the dynamics of a car engine may assist lawmakers or automotive engineers to develop solutions for cleaner mobility. Sequential data obtained from a mobile telephone system provides valuable insight into mobile telephone system performance. Sequential data obtained from industrial controller can provide important information about the operating context of industrial machine. The aforementioned systems each operate in constrained scenarios. For example, a vehicle may only follow a certain number of routes around the city and does not have full two-dimensional freedom of movement. In mobile telephone systems, operating systems allocate frequency subcarriers and perform other resource allocation within a strictly rule-governed context. Therefore, the response of such systems is structured and multi-modal. For example, when a vehicle approaches a crossroads on a 2D grid, the 2D position of the vehicle is rigidly enforced to one of three forward directions. The vehicle does not enjoy full freedom of movement on the 2D grid. Therefore, the time series response of the vehicle is multi-modal. Existing sequence prediction approaches do not handle multi-modality effectively. Existing methods for data modelling make restricting assumptions, such as Gaussianity, to make learning tractable and efficient. Such an approach can focus only on the dominant mode, and thereby neglects important structure in the data. The present specification describes variational dynamic mixtures (VDM). The generative process of a VDM is a neural state-space model (SSM). Advantageously, the machine learning training method according to the first aspect provides a multi-modal inference model. According to a subsidiary aspect, a new variational objective is discussed.

To summarise, VDM as described in this specification in accordance with an example embodiment of the present invention involves (i) a flexible generative neural state space machine which, as an example, comprises non-linear and non-Markovian transition dynamics, and a non-linear emission model. Furthermore, (ii) a multi-modal inference model is discussed. According to example, at each time step, the posterior approximation is a mixture distribution constructed by an ensemble of k base models having shared parameters. The technique also enables, for example, closed-form updates for the ensemble weights, and as an example, hybrid training using a likelihood-based criterion that encourages accurate forecasts, and an adversarial term that encourages sharper mode discrimination. In a practical example, a VDM trained on a dataset of taxi trajectories produces forecasts with improved multi-modality, whilst other methods over-generalise the taxi trajectories to make them lose discriminative accuracy, compared to the street map travelled by the taxis.

Alternatively, the VDM approach in accordance with an example embodiment of the present invention and discussed in this specification provides a deep state space model for modelling multi-model dynamics. The VDM comprises at least an inference model configured to propagate a plurality of stochastic recurrent neural networks RNNs to parameterise the posterior approximation with a mixture distribution. In addition, the present specification provides a variational objective for training the VDM. In addition, the present specification concerns a hybrid likelihood-adversarial regularisation term that may be used with the variational objective. The VDM presented in this specification achieves multi-modal posterior approximations that outperform sequence generators across a range of applications. The specification also suggests a new valuation metric for multi-model forecasting tasks. In other words, an inference model applying Gaussian assumptions prevents many stochastic recurrent networks from inferring local sharp multi-modal distributions. This reduces the accuracy of forecasted behaviour in respect of multi modal systems. The present specification discusses a variational dynamic mixture approach having an explicit multi-modal variational posterior, which in examples is a mixture density network at each observation step, or at at least one observation step. Intuitively, this may be understood as a variational posterior constructing an ensemble of models, each with the capacity to focus on a separate mode of the observed data.

DETAILED DESCRIPTION OF EXAMPLE EMBODIMENTS

Figure 1B:
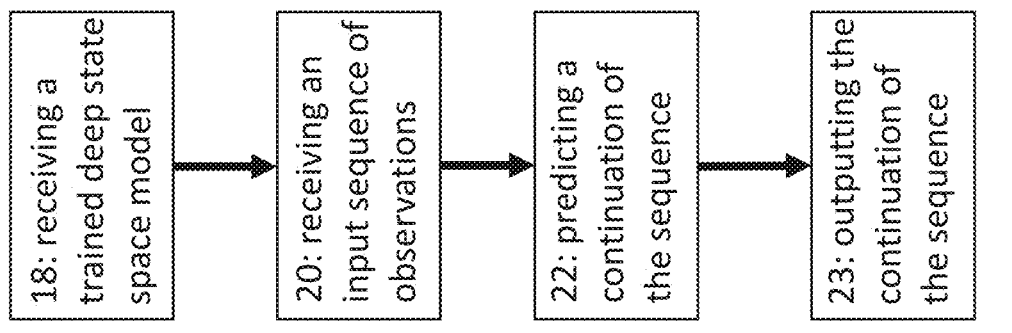
FIG. 1b schematically illustrates a method for using a trained deep state space model, in accordance with an example embodiment of the present invention.

The present specification discusses variational dynamic mixtures, a type of algorithm belonging to the class of deep state-space models (SSMs). The method in accordance with an example embodiment of the present invention discussed herein has a similar generative process compared to other deep state-space models. Given sequential observations $x_{1:T}=(x_1, \ldots, x_T)$, SSMs assume that the underlying dynamics are governed by latent states $z_{1:T}=(z_1, \ldots, z_T)$.

The following specification first presents an example of the generative process (A) and an example of the multi-modal inference model (B) of VDM. Then, an example of a new variational objective (C) that may be used with the multi-modal posterior is discussed, and an explanation is provided as to how it may be regularised with hybrid training. A proof of the performance of the variational objective is provided (D). An example of a new sampling method (E) used in the inference procedure is presented. Specific implementations and use-cases of the algorithm are then presented (F) Finally, some examples of results (G) are presented.

In an example, a machine learning model may be trained on sequential observations $x_{1:T}=(x_1, \ldots, x_T)$, such that the model can predict, based on a plausible multi-modal input sample, plausible continuations of the sequence. The sequential observations $x_{1:T}=(x_1, \ldots, x_T)$ may be a time series of scalars, characterising a mono sound signal, for example. The sequential observations $x_{1:T}=(x_1, \ldots, x_T)$ may be a time series of 2D coordinates, characterising the position of a car on a map through time. The sequential observations $x_{1:T}=(x_1, \ldots, x_T)$ may be a time series of vectors forming a finite set defining variation in time of the subcarrier allocation of an OFDM (orthogonal frequency division multiplex) radio transmitter in a wireless radio network as the radio responds to inter-channel channel interference and local multipath fading. The sequential observations $x_{1:T}=(x_1, \ldots, x_T)$ may be a time series of images.

It is not essential that the input sequential observations $x_{1:T}=(x_1, \ldots, x_T)$ are ordered in time, and the use of the letter "t" for denoting the subscript index of the sequential observations is not to be construed as limiting the sequential observations to being sequenced in time.

For example, in the case of an industrial machine, the sequential observations $x_{1:T}=(x_1, \ldots, x_T)$ may be a position series, this parameter incrementing in sequence as a tool head moves further away from a workpiece in Euclidean distance, for example. The sequential observations $x_{1:T}=(x_1, \ldots, x_T)$ are, in an example, a time series of pollution observations, or engine control data. A skilled person will appreciate that many types of sequential observations may be used to train the machine learning model discussed herein.

A. Example of Generative Model

The generative process of a SSM consists of a transition model and an emission model. The transition model $p(z_t|z_{<t})$ describes the temporal evolution of the latent states and the emission model $p(x_t|z_{\leq t})$ maps the states to observations. In an example, it is assumed that the transition model and the emission model they are parameterized by two separate neural networks, the transition network $\phi^{tra}$ and the emission network $\phi^{dec}$.

The emission network $\phi^{dec}$ decodes the latent states. In this example, it is assumed that the model is non-Markovian. This gives the model the capacity to capture longer range temporal correlations. The transition model is also parameterized with a recurrent architecture $\phi^{GRU}$ such as a Gated Recurrent Unit, also giving the model the capacity to capture longer range temporal correlations. The latent states $z_t$ are sampled recursively from:

$$z_t|z_{<t} \sim \mathcal{N}(\mu_{0,t}, \sigma_{0,t}^2 \mathbb{I}), \text{ where } [\mu_{0,t}, \sigma_{0,t}^2]=\phi^{tra}(h_{t-1}), \quad h_{t-1}=\phi^{GRU}(z_{t-1}, h_{t-2}), \tag{1}$$

The latent states $z_t$ are decoded such that the observations can be sampled from the emission model:

$$x_t|z_{\leq t} \sim \mathcal{N}(\mu_{x,t}, \sigma_{x,t}^2 \mathbb{I}), \text{ where } [\mu_{x,t}, \sigma_{x,t}^2]=\phi^{de}(z_t, h_{t-1}). \tag{2}$$

B. Example of Inference Model

VDM applies a variational family that enables multi-modality. The posterior approximation is constructed as an ensemble of k base models. The resulting posterior approximation is a mixture density network. Each component of such a mixture density network has the capacity to monitor a different mode of the posterior. The mixture components are parameterized by a shared inference network $\phi^{inf}$. Due to varying inputs, each base model component (i) has its own mean $\mu_{z,t}^{(i)}$ and variance $\sigma_{z,t}^{(i)2}$. Therefore, the posterior approximation is generated at each step of the sequential observation (in an example—input time series) as a mixture density network:

$$q(z_t|x_{\leq t}) = \sum_i^k q(z_t|z_{t-1}^{(i)}, x_{\leq t})\omega(z_{t-1}^{(i)}, x_{\leq t}), \tag{3}$$

where $z_{t-1}^{(i)} \sim q(z_{t-1}|x_{<t})$

The $z_{t-1}^{(i)}$ are sampled from the posterior approximation from the previous time step $q(z_{t-1}|x_{<t})$, and $\omega(z_{t-1}^{(i)}, x_{\leq t})$ denotes a weighting function with values between 0 and 1.

The mixture components $q(z_t|z_t^{(i)}-1, x_{\leq t})$ are density networks which are parameterized by a recurrent network $\phi^{GRU}$. $\phi^{GRU}$ is also used to track the recurrence of the latent states in the generative model and the inference network $\phi^{inf}$:

$$q(z_t|z_{t-1}^{(i)}, x_{\leq t}) = \mathcal{N}(\mu_{z,t}^{(i)}, \sigma_{z,t}^{(i)2}\mathbb{I}), \tag{4}$$

$$[\mu_{z,t}^{(i)}, \sigma_{z,t}^{(i)2}] = \phi^{inf}(x_t, h_{t-1}^{(i)}),$$

$$h_{t-1}^{(i)} = \phi^{GRU}(z_{t-1}^{(i)}, h_{t-2}),$$

$$h_{t-1} = \sum_i^k \omega(z_{t-1}^{(i)}, x_{\leq t})h_{t-1}^{(i)}$$

The varying inputs that make the components of the mixture density network differ from each other are the hidden states $h_{t-1}^{(i)}$. These states recursively summarize the sample paths from previous approximate posteriors. The mixture weights $\omega_t^{(i)}$ are, for example, computed in closed form by the normalized product of their predictive likelihoods.

The choice of weighting function $\omega(z_{t-1}^{(i)}, x_{\leq t})$ in equation (3) and the choice of sampling method defines one of a plurality of alternative variational families. The weighting function is, in a first example, defined as an indicator function, where the non-zero index is sampled from a categorical distribution with probabilities $\omega^j$ proportional to the likelihood $\omega^j \propto p(x_t, z_{t-1}, x_{<t})$, as shown in equation (5). According to a second example, the weights are configured to set the non-zero component by selecting the sample that achieves the highest likelihood. A skilled person will appreciate that further schemes for configuring the weights may be provided.

$$\omega(z_{t-1}^{(i)}, x_{\leq t}) := \mathbb{1}(i = j \sim Cat(\cdot \mid \omega^1, \ldots, \omega^k)), \quad (5)$$

$$\omega(z_{t-1}^{(i)}, x_{\leq t}) := \mathbb{1}\left(i = \underset{j}{\operatorname{argmax}} p(x_t \mid z_{t-1}^{(j)}, x_{<t})\right). \quad (6)$$

The multi-modality of VDM arises from the explicit drawing of k ancestor particles from the previous variational posterior at each observation step (for example, at each time step). To sample $z_{t-1}^{(i)}$, there are several available methods. For example, $z_{t-1}^{(i)}$ maybe sampled using Monte-Carlo sampling, randomised quasi-Monte-Carlo, or the stochastic cubature approximation that will be described subsequently. A skilled person will appreciate that other sampling schemes may be used to draw the k ancestor particles from the previous variational posterior at each observation step.

To summarise, the variational family of VDM uses k-based distributions that are obtained by pushing ancestor samples from $q(z_{t-1}|x_{>t})$ through a shared inference network $\phi^{inf}$. These base models are re-weighted according to how likely the new observation at time t is under these sampled values for the previous latent state. In the next section, a figure of merit called the evidence lower bound (ELBO) is discussed. When the ELBO is maximised optimally, it assists in the discovery of the variational family closest to the true posterior.

One effect of constructing a posterior approximation at each observation step as a mixture density network means that input sequences having multi-modality can be accurately predicted following training. In the opposite case, a posterior approximation can be constructed using a unimodal (Gaussian) distribution, but this is often not well fitted to the data structure. Accordingly, in the case of a unimodal distribution, unwanted averaging is applied to multi-modal data which leads to inaccuracies in the sequence prediction eventually generated by the trained model.

C. Example of Variational Objective

According to an example, an objective configured to optimise the parameters of the generative model and inference model $\phi=[\phi^{tra}, \phi^{dec}, \phi^{GRU}, \phi^{inf}]$. The ELBO is defined, at each sequence step (time step) as:

$$\mathcal{L}_{ELBO}(x_{\leq t}, \phi) := \quad (7)$$

$$\mathbb{E}_{q(z_{t-1}|x_{\leq t})}\left[\mathbb{E}_{q(z_t|z_{t-1}, x_{\leq t})}\left[\log \frac{p(x_t \mid z_t, z_{t-1}, x_{<t})p(z_t \mid z_{t-1}, x_{<t})}{q(z_t \mid z_{t-1}, x_{\leq t})}\right]\right].$$

The ELBO is a lower bound of the log evidence $\log p(x_T, x_{<t})$.

$$\log p(x_t|x_{<t}) \geq \mathcal{L}_{ELBO}(x_{\leq t}, \phi) \quad (8)$$

In addition to the ELBO, the objective of VDM may optionally comprise two regularization terms $\mathcal{L}_{pred}$ and $\mathcal{L}_{adv}$:

$$\mathcal{L}_{VDM}(\phi) = \quad (9)$$

$$\sum_{t=1}^{T} \mathbb{E}_{p_{data}}[-\mathcal{L}_{ELBO}(x_{\leq t}, \phi) - \omega_1 \mathcal{L}_{pred}(x_{\leq t}, \phi)] + \omega_2 \mathcal{L}_{adv}(x_{\leq t}, \phi).$$

The effect of applying the ELBO with, and without the regularization terms $\mathcal{L}_{pred}$ and $\mathcal{L}_{adv}$ can be assess, for example, using an ablation study. In equation (9) $\omega_1, \omega_2$ may be considered to be hyperparameters. An ablation study has shown that VDM provides competitive performance without the presence of $\mathcal{L}_{pred}$ and $\mathcal{L}_{adv}$, but that their inclusion provides the strongest performance. The first regularization term $\mathcal{L}_{pred}$ encourages the variation posterior from the previous sequence step to produce samples that maximize the predictive likelihood:

$$\mathcal{L}_{pred}(x_{\leq t}, \phi) - \log \mathbb{E}_{q(z_{t-1}|x_{\leq t})}[p(x_t \mid z_{t-1}, x_{<t})] \approx \quad (10)$$

$$\log \frac{1}{k} \sum_{i}^{k} p(x_t \mid z_{t-1}^{(i)}, x_{<i}).$$

Therefore, $\mathcal{L}$pred is an approximation of the log-evidence and for certain choices of the weighting function (such as equation (5) above) it is an upper bound for the ELBO. In this case, maximizing it (maximizing $p(x_t|z_{t-1}, x_{<t})$) Also, in practice including $\mathcal{L}_{pred}$ balances the trade-off between the reconstruction term and the KL-divergence term in the ELBO favourably.

The second optional regularization term, $\mathcal{L}_{adv}$, in equation (11) also improves the results of VDM. The term $\mathcal{L}_{adv}$ is provided according to a hybrid adversarial-likelihood training concept. The hybrid adversarial-likelihood training concept may be adapted to ideas of generative models of dynamics. The adversarial term $\mathcal{L}_{adv}$ used a forward Kullback-Leibler (KL) divergence, enabling "quality driven training" to discourage probability mass in spurious areas.

$$\mathcal{L}_{adv}(x_{\leq t}, \phi) = \mathcal{D}_{KL}(p(x_t|x_{<t})\|p_{data}(x_t|x_{<t})) = \mathbb{E}_p[\log p(x_t|x_{<t}) - \log p_{data}(x_t|x_{<t})], \quad (11)$$

In equation (11), p is short for $p(x_t|x_{<t})$. The true predictive distribution $p_{data}(x_t|x_{<t})$ is unknown. Optimization of equation (11) corresponds to training the generator of a conditional GAN, while assuming an optimal discriminator. Therefore, this term can be optimized in an adversarial manner, always optimizing on $x_{<t}$.

D. Proof of ELBO as a Proper Lower Bound of the Log Evidence $$\log p(x_t|x_{<t}) \geq \mathbb{E}_{q(z_{t-1}|x_{\leq t})}[\log p(x_t|z_{t-1}, x_{<t})] \geq \mathcal{L}_{EB}(x_{\leq t}, \phi) \quad (12)$$

Proof: Firstly, a proof is provided that the first lower bound $\log p(x_t|x_{<t}) \geq \mathbb{E}_{q(z_{t-1}|x_{\leq t})}[\log p(x_t|z_{t-1}, x_{<t})]$. Over the latent variable $z_{t-1}$, the lower bound on the log evidence log $p(x_t|x_{<t})$ is derived as $$\log p(x_t|x_{<t}) = \log \int p(x_t|z_{t-1}, x_{<t})p(z_{t-1}|x_{<t})dz_{t-1}$$

$$\geq \mathbb{E}_{q(z_{t-1}|x_{\leq t})}[\log \quad p(x_t|z_{t-1}, x_{<t}) - \log \quad q(z_{t-1}|x_{\leq t}) + \log p(z_{t-1}|x_{<t})], \quad (13)$$

where the smoothing variational posterior $q(z_{t-1}|x_{<t})$ is factorized as the product of the variational posterior $q(z_{t-1}|x_{<t})$ from the previous time step and the weighting function $\omega(z_{t-1}, x_{\leq t})$.

$$q(z_{t-1} \mid x_{\leq t}) = q(z_{t-1} \mid x_{<t}) \frac{p(x_t \mid z_{t-1}, x_{<t})}{p(x_t \mid x_{<t})} = q(z_{t-1} \mid x_{<t})\omega(z_{t-1}, x_{\leq t}). \quad (14)$$

The function of equation (14) is substituted into equation (13), and the prior $p(z_{t-1}|x_{<t})$ in equation (13) is approximated by the previous variational posterior $q(z_{t-1}|x_{<t})$:

$$\log p(x_t \mid x_{<t}) \geq \qquad (15)$$

$$E_{q(z_{t-1} \mid x_{\leq t})}\left[\log p(x_t \mid z_{t-1}, x_{<t}) + \log \frac{q(z_{t-1} \mid x_{<t})}{q(z_{t-1} \mid x_{<t})\omega(z_{t-1}, x_{\leq t})}\right] =$$

$$E_{q(z_{t-1}\mid x_{\leq t})}[\log p(x_t \mid z_{t-1}, x_{<t})] E_{q(z_{t-1}\mid x_{\leq t})}[-\log \omega(z_{t-1}, x_{\leq t})]$$

where the second term is larger and equal to zero (the second choice of ω), since the value of the weighting function is in the range [0,1]. Thus, the first lower bound is proved.

Then, a proof of the second lower bound $E_{q(z_{t-1}\mid x_{\leq t})}[\log p(x_t\mid z_{t-1}, x_{<t})] \geq \mathcal{L}_{EB}(x_{\leq t}, \phi)$ is provided. Since both sides taking the expectation over the smoothing variational posterior $q(z_{t-1}\mid x_{\leq t})$, the predictive log-likelihood log $p(x_t\mid z_{t-1}, x_{<t})$ is the relevant term to focus on.

$$\log p(x_t \mid z_{t-1}, x_{<t}) = \qquad (16)$$

$$\log E_{q(z_t\mid z_{t-1}, x_{\leq t})}\left[p(x_t \mid z_t, z_{t-1}, x_{<t})\frac{p(z_t \mid z_{t-1}, x_{<t})}{q(z_t \mid z_{t-1}, x_{\leq t})}\right] \geq$$

$$E_{q(z_t\mid z_{t-1}, x_{\leq t})}\left[\log p(x_t \mid z_t, z_{t-1}, x_{<t}) + \log \frac{p(z_t \mid z_{t-1}, x_{<t})}{q(z_t \mid z_{t-1}, x_{\leq t})}\right].$$

Thus, together with the first lower bound, the lower bound claim in relation to the ELBO is proven.

Since $\mathcal{L}_{pred}$ (equation 10) is an approximation of the log evidence log $p(x_t\mid x_{<t})$, equation (12) also holds true for it. Maximizing $\mathcal{L}_{pred}$ means maximizing $p(x_t\mid z_{t-1}, x_{<t})$, and also means maximizing the intermediate upper bound of ELBO in equation (12), which is helpful to achieve a tighter ELBO.

E. Example of Sampling Method

As stated above, the multi-modality of VDM arises from the explicit drawing of k ancestor particles from the previous variational posterior at each observation step (for example, at each time step). In an example, the Monte-Carlo method, or randomized quasi Monte-Carlo method, may be used to sample ancestor particles from the previous variational posterior at each observation step. However, for a relatively small number of samples of k, Monte-Carlo methods lack a mechanism to control the quality of samples (randomized quasi Monte-Carlo shows improvement in some cases).

According to an embodiment, a semi-stochastic variational posterior sampling approach is provided. The approach may, in an example, be based on the cubature approximation. The cubature approximation is a specific technique for selecting particles from the variational posterior. In particular, the cubature approximation spreads out the samples of the variational posterior in a way such that their first two moments match the first two moments of the sampled distribution.

The cubature approximation is a deterministic method to integrate a nonlinear function $f(\cdot)$ of Gaussian random variable $z \sim \mathcal{N}(\mu_z, \sigma_z^2)$, with $z \in \mathbb{R}^n$ n-dimensional numerically. The method proceeds by constructing 2n+1 unit sigma points $\xi^{(i)}$, $z^{(i)}=\mu_z+\sigma_z\xi^{(i)}$.

The cubature approximation is a weighted sum of the sigma points propagated through the nonlinear function $f(\cdot)$, $$\int f(z)\mathcal{N}(z\mid \mu_z, \sigma_{zt}^2)dz \approx \sum_{i=1}^{2n+1} \gamma^{(i)} f(z^{(i)}). \qquad (17)$$

The analytic formulas below determine how to compute the weights $\gamma^{(i)}$ and the locations of the unit sigma points $\xi^{(i)}$:

$$\gamma^{(i)} = \begin{cases} \frac{1}{2(n+\kappa)}, & i = 1, \ldots, 2n \\ \frac{\kappa}{n+\kappa}, & i = 0 \end{cases} \qquad (18)$$

$$\xi^{(i)} = \begin{cases} \sqrt{n+\kappa}\, e_i & i = 1, \ldots, n \\ \sqrt{n+\kappa}\, e_i & i = n+1, \ldots, 2n \\ 0 & i = 0 \end{cases}$$

where κ is a hyperparameter controlling the spread of the sigma points in the n-dimensional sphere. As an example, κ=0.5. Further $e_i$ represents a basis in the n-dimensional space, which is chosen to be a unit vector in Cartesian space, e.g. $e_1=[1, 0, \ldots, 0]$.

The cubature approximation proceeds by constructing k=2n+1 so-called unit sigma points $\xi^{(i)}$, which are optimally spread out on the n-dimensional standard Gaussian. The sigma points $z^{(i)}=\mu_z+\sigma_z\xi^{(i)}$ are the samples with the same mean and covariance as z. The analytic formulas discussed above determine how to compute the weights $\gamma^{(i)}$ and the unit sigma points $\xi^{(i)}$. In an example, hyperparameters may be chosen to set the weights $\gamma^{(i)}$ equally.

A semi-stochastic sampling method has therefore been described which combines the cubature approximation with Monte-Carlo method. In SCA, the deterministic sigma points are replaced by stochastic "sigma variables". Standard Gaussian noise $\epsilon \sim \mathcal{N}(0, \lambda^{-1}I)$ is used to define the sigma variables as $z^{(i)}=\mu_z+\sigma_z(\xi^{(i)}+\epsilon)$. The important weights $\gamma^{(i)}$ of sigma variables are set as the weights of associated unit sigma points from the cubature approximation.

An effect of using the Stochastic Cubature Approximation is that it typically requires fewer samples than Monte-Carlo methods, because the sigma points are carefully chosen to capture the first two moments of the underlying distribution. Another effect of using the Stochastic Cubature Approximation is that by deriving a semi-stochastic version for approximate marginalization, the resulting distribution resembles a multi-modal mixture, and hence a desired parametric form of the VDM inference model.

F. Implementations

Figure 1A:
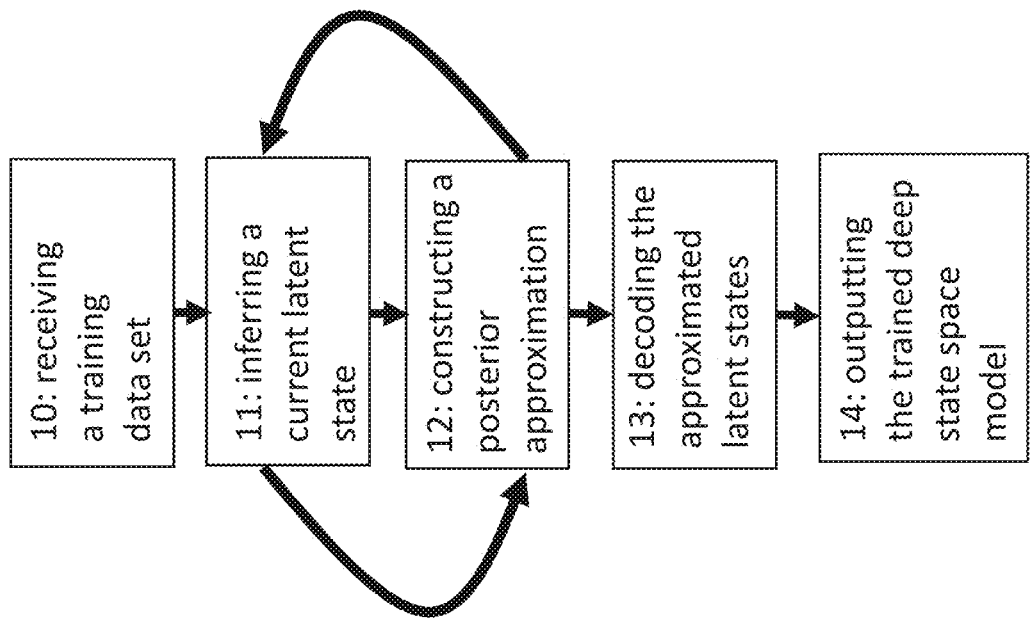
FIG. 1a schematically illustrates a computer-implemented method for generating a trained deep state space model, in accordance with an example embodiment of the present invention.

FIG. 1a schematically illustrates a computer-implemented method for generating a trained deep state space model.

According to a first aspect of the present invention, there is provided a computer-implemented method for training a deep state space model using machine learning, wherein the deep state space model comprises a generative model and a multi-modal inference model. The generative model further comprises a transition model configured to describe a change of a plurality of latent states, and an emission model configured to decode the plurality of latent states to provide thereby a plurality of synthetic observations. The method comprises:

a) receiving a training data set comprising a sequence of observation vectors $(X_{1:T}=(X_1, \ldots, X_T))$ each obtained at an observation step;

for a plurality of observation vectors comprised in the sequence of observation vectors, iterating between b), c), and d):

b) inferring, using the multi-modal inference model, a current latent state of the generative model by mapping a current observation vector obtained at a current observation step of the sequence of observation vectors to obtain a probability distribution of the current latent state;

c) constructing, using the multi-modal inference model, a posterior approximation ($q(z_t|x_{\leq t})$) of the current latent state as a mixture density network, to thus yield a plurality of approximated latent state vectors;

for a plurality of observation vectors comprised in the sequence of observation vectors:

d) decoding, using the emission model, the plurality of approximated latent state vectors to provide thereby a plurality of synthetic observations; and e) outputting the trained deep state space model.

For example, the sequence of observation vectors may comprise a sequence of image data, video data, or audio data, a sequence of data for monitoring an operator of a machine or a driver, a sequence of data received from an industrial machine, a sequence of data representing historical vehicle routing or engine performance a sequence of data describing wireless network performance or wireless network resource allocation.

Accordingly, iterating between steps b), c), and d) provides reconstructed observations (the plurality of synthetic observations) that may be provided to generate an objective function for use in the training of the model. The plurality of synthetic observations may be compared to a corresponding plurality of real data measurements, from which the objective function may be calculated.

Figure 2:
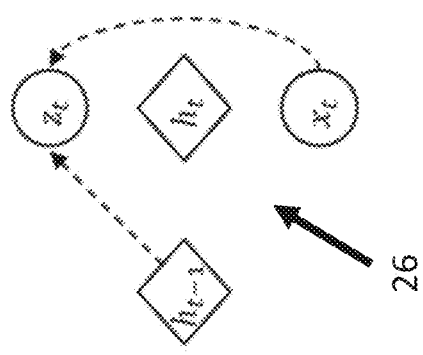
FIG. 2 schematically illustrates a generative process and an inference process, in accordance with an example embodiment of the present invention.
Figure 2:
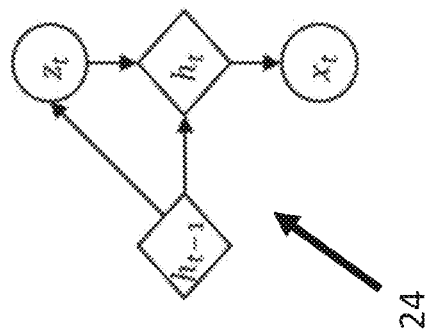

FIG. 2 schematically illustrates a generative process 24 and an inference process 26 according to an example.

As a specific example of the present invention, a scenario can be considered in which the inference network $\phi^{inf}$ receives observations, and tries to infer the associated latent state. In this example, an encoder network maps an initial observation $x_1$ onto parameters that describe a probability distribution of the initial latent state $z_0$ in latent space, and which can be altered subsequently. In this case, the example is provided for sampling of the probability distribution using the stochastic cubature approximation, but the example may be adapted to use other sampling schemes.

In a first step of an example inference process according to the method, the distribution of the current latent state is sampled. In an example, the sampling may be performed according to the stochastic cubature approximation, by sampling 2n+1 sigma variables with importance weights from the distribution of the current latent state, where n is the dimension of the latent states. To apply the stochastic cubature approximation, the mean and the variance of the probability distribution are obtained.

In a second step of the example inference process, the sampled 2n+1 sigma variables are used to update the average hidden state from the past recursion, to 2n+1 hidden states with a recurrent neural network, for example a gated recurrent unit GRU. The new averaged hidden state in the current recursion is the sum of 2n+1 hidden states weighted by important weights of sigma variables.

In a third step of an example inference process, when the next observation arrives, 2n+1 hidden states are concatenated with this next observation. The resulting vector is inserted into the inference network $\phi^{inf}$ to parameterize 2n+1 Gaussian components. In a fourth step of an example inference process, the mixture weight of each Gaussian component is computed by the normalized product of the likelihood of the coming observation in the predictive distribution, and the importance weight of the associated unit sigma point. The predictive distribution is obtained by substituting the associated hidden state in the transition model, and then mapping it to the data space. In a fifth step of the example inference process, the updated distribution is a mixture density network with means and variances computed in the third step, and weights computed in the fourth step. Using moment matching, the matched mean and variance of the updated distribution are computed. In this example, the first to fifth steps are repeated for each observation in the received sequence of observations of, for example, training data. Of course, it is not essential that the inference is performed on all observations in the received sequence of observations.

In the generation process, the transition network $\phi^{tra}$ receives the distribution of the latent state and tries to propagate the distribution to the next time step. The emission network $\phi^{dec}$ receives the distribution of the latent state. The emission network $\phi^{dec}$ maps the distribution of the latent state onto data space (observation space).

In a first step of an example generation process, the distribution of the latent state is sampled. The samples are used to update the hidden states using a recurrent neural network, such as a gated recurrent unit (GRU). In a second step of the example generation process, the transition network $\phi^{tra}$ takes the hidden states as inputs, and outputs parameters describing a distribution of the latent state at the next timestep. In a third step of the example generation process, the predicted distribution of the latent state at the next time step is sampled. In a fourth step of the example generation process, the emission network $\phi^{dec}$ takes the samples of the predicted distribution of the latent state at the next time step as inputs, and maps them onto data space (observation space). The output is, for example, a point, or a parameterized distribution. These may be considered to be a series, or plurality, of synthetic observations.

The first to fourth steps of the example generation process are performed repeatedly at each step of the predicted series. Iterative continuation of the process provides a series of synthetic observations defining possible continuations of the sequence of observations used to train the network.

In an example of the method, iterative optimization of the parameters of the generative model and the multi-modal inference model by comparing the sequence of observation vectors ($x_{1:T}=(x_1, \ldots, x_T)$) of the training data set to the plurality of synthetic observations according to an objective function (cost function) calculated for each iteration. The objective function optionally comprises the evidence lower bound (ELBO). In an example, the evidence lower bound (ELBO) is as defined in equation (7) above. An effect is that the model may be optimized to preserve multi-modality in the training data.

In an example of the method, the objective function further comprises a first regularization term based on an approximation of the log evidence. In an example, the first regularization term is as defined in equation (10) above. In an example, the objective function further comprises a second regularization term based on an adversarial function. In an example, the objective function may comprise a regularization term comprising an approximation of the log evidence as an adversarial function. In an example, the second regularization term is as defined in equation (11) above.

In an example of the method, the posterior approximation $q(z_t|x_{\leq t})$ is sampled using Monte-Carlo sampling, or randomized quasi Monte-Carlo sampling.

In an example of the method, constructing the posterior approximation $q(z_t|x_{\leq t})$ of the current latent state as a mixture density network further comprises: sampling the posterior approximation from a previous observation step according to a stochastic cubature approximation.

In an example of the method, the stochastic cubature approximation is generated by constructing 2n+1 unit sigma points optimally distributed on an n-dimensional standard Gaussian, wherein the sigma points are samples having the same mean and covariance as the latent state corresponding to the observation step.

In an example of the method, the stochastic cubature approximation is as defined in equations (17) and (18) above.

Figure 4:
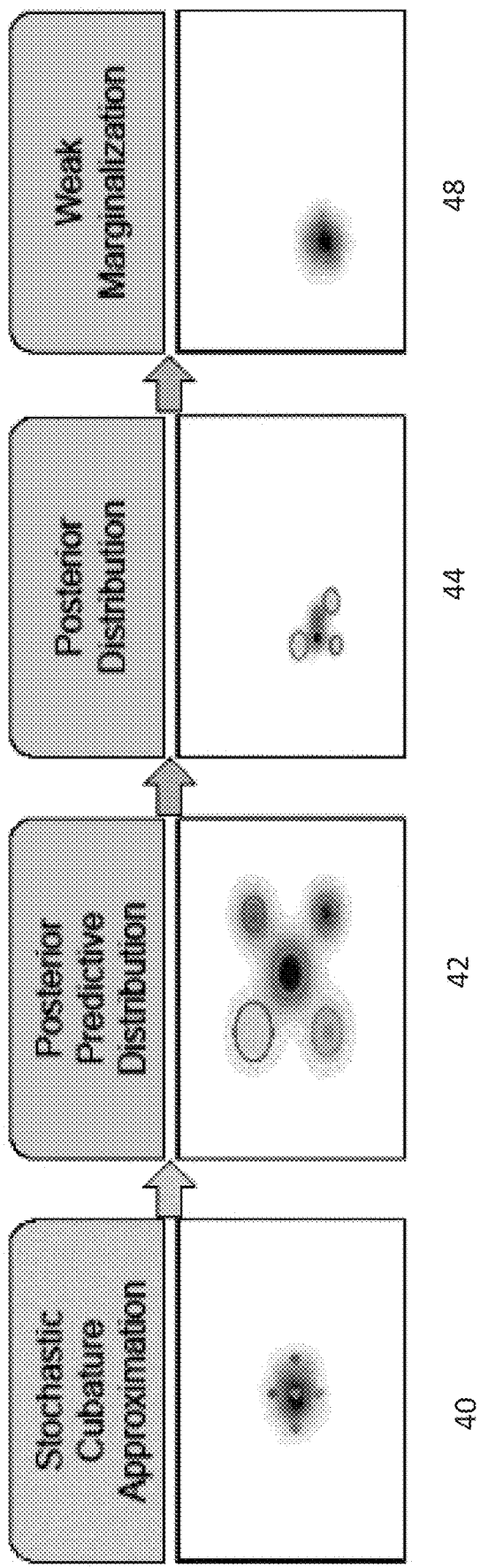
FIG. 4 schematically illustrates a filtering procedure, in accordance with an example embodiment of the present invention.

FIG. 4 graphically illustrates the effect of a filtering procedure according to an example.

At stage 40, the effect of applying the stochastic cubature approximation to a distribution is shown. At stage 42, the posterior predictive distribution is obtained. At stage 44, the posterior distribution is generated. At stage 48, weak marginalization is performed.

In an example of the method, a weighting function is applied to samples of the posterior approximation at each time step. The weighting function is (i) an indicator function is sampled from a categorical distribution, or (ii) the weighting function comprises a non-zero component that is selected to achieve the highest likelihood.

In an example of the method, the indicator function is as defined by equation (5) above. In an example of the method the transition network and/or the mixture components are parameterized by a gated recurrent unit. In an example of the method, the transition model is non-Markovian.

In an example of the method, the training data set comprises a sequence of observation vectors ($X_{1:T}=(X_1, \ldots, X_T)$) defining a time series training sequence. In an example of the method, the training data set comprises a sequence of observation vectors ($X_{1:T}=(X_1, \ldots, X_T)$) defining a position series training sequence. In an example of the method, the training data set comprises a sequence of observation vectors ($X_{1:T}=(X_1, \ldots, X_T)$) defining a frequency series training sequence.

FIG. 1b schematically illustrates a method for using a trained deep state space model.

According to a second aspect, there is provided a computer-implemented method for using a trained machine learning model in a predictive system, comprising:
  receiving a trained deep state space model generated according to the first aspect;
  receiving, an input sequence of observation vectors ($X_{1:T}=(X_1, \ldots, X_T)$) each obtained at an observation step;
  predicting at least one continuation of the sequence of observation vectors ($X_{1:T}=(X_1, \ldots, X_T)$), using the trained machine learning model, wherein the continuation comprises a synthetic observation obtained from the trained machine learning model; and
  outputting the at least one continuation of the sequence of observation vectors. An effect is that by applying the trained machine learning model, one more plausible continuations of a sequence may be generated automatically, using the trained machine learning model, based on an initial sequence of observations.

According to an example, there is provided a computer-implemented method for using a trained machine learning model according to the second aspect, wherein the input sequence of observation vectors ($X_{1:T}=(X_1, \ldots, X_T)$) is a time series representing:
  a sequence of image data or audio data; or
  a sequence of data for monitoring an operator; or
  a sequence of data received from an industrial machine,
  a sequence of data representing historical vehicle routing or engine performance, or
  a sequence of data describing wireless network performance or wireless network resource allocation.

Figure 3:
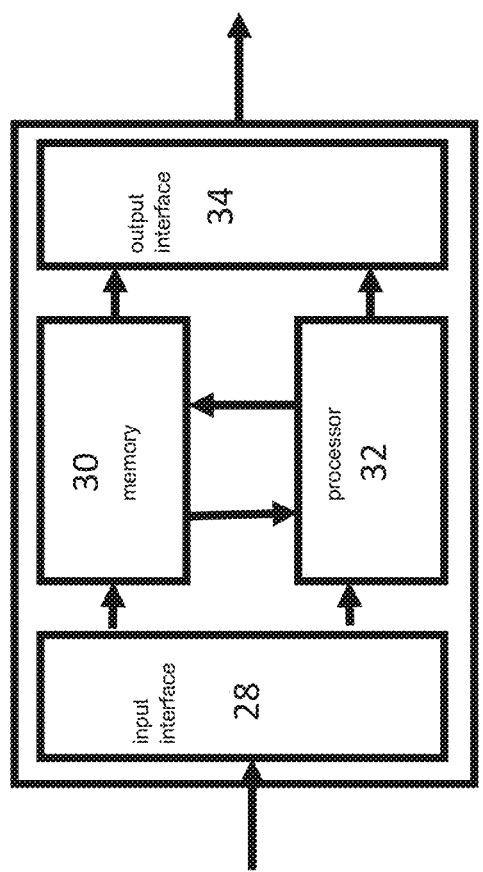
FIG. 3 schematically illustrates an apparatus configured to train a deep state space model, in accordance with an example embodiment of the present invention.

FIG. 3 schematically illustrates an apparatus configured to train a deep state space model.

According to a third aspect of the present invention, there is provided an apparatus configured to train a deep state space model using machine learning.

In accordance with an example embodiment of the present invention, the apparatus comprises an input interface 28, a memory 30, a processor 32, and an output interface 34.

The input interface 28 is configured to receive a training data set comprising a sequence of observation vectors ($X_{1:T}=(X_1, \ldots, X_T)$) each obtained at an observation step.

The processor 32 is configured to execute a deep state space model comprising a generative model and a multi-modal inference model, wherein, in use, the generative model further comprises a transition model configured to describe a change of a plurality of latent states, and an emission model configured to decode the plurality of latent states to provide thereby a plurality of synthetic observations.

The processor 32 is further configured, for a plurality of observation vectors comprised in the sequence of observation vectors, to iterate (b) the inference, using the multi-modal inference model, of a current latent state of the generative model by mapping a current observation vector obtained at a current observation step of the sequence of observation vectors to obtain a probability distribution of the current latent state, and (c) the construction, using the multi-modal inference model, of a posterior approximation ($q(z_t|x_{\leq t})$) of the current latent state as a mixture density network, to thus yield a plurality of approximated latent state vectors, and (d) for a plurality of observation vectors comprised in the sequence of observation vectors, the processor is configured to decode, using the emission model, the plurality of approximated latent state vectors to provide thereby a plurality of synthetic observations. The processor 32 is configured to output the trained deep state space model via the output interface 34.

In an example, the apparatus is a personal computer, server, cloud-based server, or embedded computer. The memory 30 of the apparatus stores a computer program that, when executed by the processor 32, causes the processor 32 to execute the functionalities described by the computer-implemented method according to the first aspect.

According to a fourth aspect of the present invention, there is provided a computer program element comprising a program for training, using machine learning, a deep state space model on a training data set comprising a sequence of observation vectors ($X_{1:T}=(X_1, \ldots, X_T)$) each obtained at an observation step, wherein the computer program element, when executed by a computer, causes the computer to perform the steps of the first aspect.

According to a fifth aspect of the present invention, there is provided a computer program element comprising trained model data defining a deep state space model generated by a computer executing a computer-implemented method according to one of embodiments of the first aspect. The computer program element of the fourth or fifth aspects may comprise, for example, machine-readable instructions that are stored on a computer memory.

According to a sixth aspect of the present invention, there is provided a computer readable medium comprising the computer program element of either of the fourth or fifth aspects. In an example, the computer readable medium stores the computer program element on non-volatile memory such as a hard drive, a USB portable drive, or SSD memory.

According to an example, there is provided a vehicle comprising a controller configured, at least partially, using the model trained according to the first aspect. The training data set comprises a sequence of observation vectors describes one or more of battery state of health of an electric vehicle, an external traffic or route model, a driver behaviour model, or an engine model of the vehicle. For example, a sequence of sensor data or other data (for example video, LIDAR, ultrasonic or thermal sensors, communication with other vehicles or devices or a combination of two or more of these data sources) may be obtained. A probability density function may be learned for the foregoing features. The trained model can then be used in a vehicle to predict potential future operating conditions. This may, for example, enable countermeasures such as breaking, evasive action, or emergency braking to be initiated. An effect of this is that, using a sequence prediction model trained according to the method of the first aspect, battery health of an electric vehicle may be more accurately predicted, a route finding algorithm may be more accurately predicted, and driver behaviour or engine behaviour of the vehicle can be more accurately predicted.

According to example, a driver behaviour model may be trained based on sensor measurements such as a video of the driver, steering, braking, or physiological parameters measured with a smartwatch, for example. Features extracted can, for example, be steering behaviour, acceleration, eye-movement, and heart rate. The action of a driver behaviour model in response to such inputs, when used in a vehicle, may be, for example, changing the behaviour of the ECU (engine control unit), changing speed of the car, initiating an emergency brake, for example.

According to example, an engine model uses sensor measurements (for example, obtained from the ECU) to extract features about the engine dynamics. Accordingly, the sequence of observations comprises sensor measurements from an ECU. An engine model may be trained on such a sequence of observations according to the first aspect. When subsequent observations are obtained from the ECU, the trained model can predict engine performance modes extending into the future. For example, the trained model can predict when the engine enters an operating mode such as a low oil status or an undesirable vibration status that indicates servicing of the vehicle is required.

According to an example, an external model may be trained according to the method of the first aspect. The sequence of observations comprises sensor measurements (such as video, LIDAR, communication with other smart vehicles) to extract features about other traffic participants and surrounding objects. Features could be 3D-world coordinates, corners relative to the vehicle, cordless relative to surrounding objects, and other traffic participants. The model is trained on such extracted features. The trained external model can, for example, be used in a vehicle. When a new sequence of observations is obtained, the trained model can forecast possible future behaviour such as velocity changes of another vehicle.

According to an example, there is provided a wireless base station and/or handset comprising a controller configured, at least partially, using the model trained according to the method of the first aspect. The training data set comprises a sequence of observation vectors describing one or more of: data demand at a plurality of network nodes, attainable uplink or downlink rate relative to geographical position of a handset, physical layer parameters such as MIMO (Multiple Input, Multiple Output) antenna configurations, OFDM (Orthogonal Frequency Division Multiplex) subcarrier configuration, QAM (Quadrature Amplitude Modulation) index, channel coding modes, channel response between downlink and uplink, or a HARQ (Hybrid Acknowledge Repeat Request) configuration.

An effect of this is that a communication channel can be more efficiently used based on small number of observations of common parameters of a wireless communications network.

According to an example, the sequence of observations comprises one or more vectors defining data rate or data demand at one or more nodes (base stations) of a communications network, or within one or more macrocells, microcells, picocells, or femtocells of a wireless communications network, such as a 5G communications network. Furthermore, the data rate or data demand measurements are, in an example, combined with one or more of other measurements at the nodes such as temperature, or time of day. The computer-implemented method according to the first aspect is applied to this sequence of observations. This provides a trained model enabling resource allocation at one of more of the nodes of the communication network based on the input sequence of observations by adjusting the MIMO antenna configuration, adjusting the OFDM subcarrier distribution, the QAM modulation index, the channel coding modes, or the parameters of the HARQ configuration.

According to an example, an industrial machine or robot configured using the model comprising a controller configured, at least partially, using the model trained according to the first aspect. The training data set comprising a sequence of observation vectors describing one or more of: position of a portion of the machine or robot, an operating temperature, a vibration measure, or a sound or video measurement. The fact is that an industrial machine or robot may be more accurately controlled.

According to an example, the sequence of observations comprises one or more vectors obtained from a prototyped engineering device. For example, the prototype device is a power tool, a home appliance, or a new engine design). Data from internal sensors of the device, or external sensors (such as video or LIDAR) are collected as the sequence of observations. The computer-implemented method according to the first aspect is applied to this sequence of observations. Therefore, the trained model can be incorporated as part of a "digital twin" of the prototyped engineering device. A further sequence of observations obtained from a related engineering device can monitored. The trained model can provide a forward prediction of future anomalies in device behaviour (e.g., energy consumption too high, device fails too soon). In an example, the trained model can initiate the safe shutdown of the monitored device if the predicted sequence based on the further sequence of observations indicate an unsafe condition.

According to an example, the sequence of observations is obtained from a prototype "Internet of Things" (IoT) system. The sequence of observations may comprise information obtained from a smart-home, or smart-manufacturing system. Sensor measurements are collected and tracked, with critical thresholds (such as minimum oxygen level, or maximum temperature) defined, and used to train a machine learning model according to the method of the first aspect. A further sequence of observations is obtained from an in-service IoT system similar to the prototype "Internet of Things" (IoT) system. If critical performance conditions or thresholds are likely to be violated, within a specific time horizon, the machine learning model trained on the sequence of observations is obtained from a prototype "Internet of Things" (IoT) system can perform a further action. An example of a further action is to stop the production line, to open or close the valve, to open or close a window, for example.

According to an example, the model may be trained according to the method as a first aspect to perform video classification tasks. For example, frame-based features may be extracted from video (using an object tracking approach). A video forecasting model is trained based on the frame-based features. Unseen videos may form a further sequence of observations input into the video forecasting model. The trained model may provide a predictions as to the future development of the video useful for video classification. The forecast features are fed into a classifier with different possible effects based on the use-case. For example, the classifier may predict whether or not a traffic accident is about to occur. If so, the classifier may communicate with emergency services. Alternatively, the classifier may predict whether or not a violent scene is about to occur in a video, and may activate content protection if so.

F. Specific Implementation of the Network

An example implementation of the VDM machine learning model is provided below. This implementation is used in this specification to generate the results of the Taxi Trajectories example in section G.

The example VDM machine learning model comprises an encoder configured to embed the first observation $x_0$ to latent space as the initial latent state $z_0$. A transition network is configured to propagate the latent states $z_t$. A decoder is configured to map the latent states $z_t$ to observations $x_t$. An inference network is configured to update latent states $z_t$, given the observations $x_t$. A latent gated recurrent unit GRU is configured to summarize the historic latent states $z_{\leq t}$ given observations $h_t$. A discriminator is used to perform adversarial training.

In this example, the "Adam" optimizer is applied with a learning rate of 1e-4. However, a skilled person will appreciate that in other cases many other types of optimizer could be applied, such as basic gradient descent.

In all of the three experiments, the networks have the same architectures, but different sizes. The model size depends on observation dimension $d_x$, latent state dimension $d_z$, and the hidden state dimension $d_h$. The number of samples used at each observation step (for example, time step) in the training is $2d_z+1$. If the model output is variance, the exponential of the output is used to ensure it is non-negative.

TABLE 1

Parameterized definition of the VDM model used in the Taxi example

| Model element | Description |
| --- | --- |
| Encoder | input size is $d_x$; 3 linear layers of size 32, 32 and $2d_z$, with 2 ReLUs (rectified linear unit). |
| Transition network | input size is $d_h$, 4 linear layers of size 64, 64, 64, and $2d_z$, with 3 ReLUs. |
| Decoder | input size is $d_z$; 3 linear layers of size 32, 32 and $2d_x$, with 2 ReLUs. |
| Inference network | input size is $d_h + d_x$; 4 linear layers of size 64, 64, 64 and $d_z$, with 3 ReLUs. |
| Latent GRU | one layer GRU of input size $d_z$ and hidden size $d_h$ |
| Discriminator | one layer GRU of input size $d_x$ and hidden size $d_h$ to summarize the previous observations as the condition, and a stack of 3 linear layers of size 32, 32 and 1, with 2 ReLUs and one sigmoid as the output activation, whose input size is $d_h + d_x$ |

In the taxi trajectory example, the observation dimension $d_x$ is 2, latent state dimension $d_z$ is 6, and hidden state dimension $d_h$ is 32.

G. Example Results—Taxi Trajectories

To test the VDM approach, true samples and predicted results from a range of previous ML models were generated, and compared to VDM. The task chosen to demonstrate the multi-modal performance of VDM concerned predicting the future trajectory of the route of a taxi on a 2D grid. The training dataset was recorded in Porto, Portugal and is available on Kaggle at www.kaggle.com/crailtap/taxi-trajectory.

The full dataset is large, and the length of trajectories varies. Trajectories inside the Porto city area with length in the range of 30 and 45 were selected. The first 30 coordinates of each trajectory were extracted. Thus a dataset with a fixed sequence length of 30 was obtained. This was split into the training set of size 86,386, a validation set of size 200, and a test set of size 10000.

In the Taxi trajectory experiment, trajectories from the dataset with a fixed length of 30 were isolated, to enable a fair comparison between trajectories. The task was for the model based on Variational Dynamic Mixtures (VDM), as discussed above, to predict a future 20 observations (represented by 2D locations on a map grid at a plurality of time steps), when provided with an initial 10 observations of a taxi trajectory (represented by 2D locations on a map grid at a plurality of time steps). A feature of taxi trajectory forecasting is that the generated samples should follow the street map. Thus, a difficulty for a taxi trajectory prediction algorithm is to learn a sharp and complex distribution caused by the street map from the trajectories.

Three figures of merit were used: (i) the multi-steps ahead prediction $p(x_{t+1:t+\tau}|x_{1:t})$, (ii) the one-step ahead prediction $p(x_{t+1}|x_{1:t})$, and (iii) empirical Wasserstein distance. To evaluate the forecasting of sequence data, the negative log-likelihood is widely applied. For one-step ahead prediction, the predictive distribution can be obtained from the model in closed form. The long-term forecasting of multi-modal sequence data cannot be obtained in this way. Accordingly, the test approach applied to the taxi example generates 1000 forecasts for each of the observed initial trajectories, to simulate the predictive distribution. Then, the negative log-likelihood is empirically calculated as:

$$NLL = -\log\left(\frac{1}{N}\sum_i^n \frac{1}{\sqrt{2\pi}}\exp\left(-\frac{(\hat{x}_i - x)^2}{2}\right)\right) \quad (19)$$

Where n denotes the number of forecasts, x is the ground truth, and $\hat{x}$ represents the forecast. This equation encourages the forecasts to match the ground truth, but does not focus on evaluating the diversity of predictions.

The newly-induced evaluation metric based on the empirical Wasserstein distance is intended to be a complement to the negative log likelihood. The empirical Wasserstein distance is intended to account for the diversity and the accuracy of the predictions. The Wasserstein distance measures the distance between two empirical distributions P and Q, which can be calculated as:

$$W(P, Q) = \inf_{\pi} \left( \frac{1}{n} \sum_{i}^{n} \|(x_i - y_{\pi(i)})\|^2 \right) \quad (20)$$

Where π denotes all permutations, and x and y are the discrete samples in P and Q. to construct this evaluation, n samples with a similar initial part from the test set are constructed. For each test sample, the model generates 10n forecasts. Thus, n groups of generated samples result. The empirical Wasserstein distance between the n true samples and each group of generated samples can be calculated. The averaged empirical Wasserstein distance over n groups evaluates how well the generated samples overlap this ground truth area. Repeatedly performing this process for different initial parts enables the evaluation of the empirical Wasserstein distance between the modelled distribution and the data distribution.

To provide a comparison of VDM against other models, the same taxi prediction task was also performed using to the Recurrent Kalman Network (RKN), the conditional flow variational autoencoder (CF-VAE), Auto Encoding Monte Carlo (AESMC) a variant of the variational autoencoder sampled with Monte Carlo (VDM-MC).

TABLE 2

Taxi Trajectory training results

| | Multi-step | One-step | W-distance |
| --- | --- | --- | --- |
| RKN | 4.25 | −2.90 | 2.07 |
| VRNN | 5.51 ± 0.002 | −2.77 | 2.43 ± 0.0002 |
| CF-VAE | 2.77 ± 0.001 | n.a. | 0.75 ± 0.0003 |
| AESMC | 3.54 ± 0.003 | −2.51 | 0.73 ± 0.0004 |
| VDM-S | 3.15 ± 0.004 | −3.04 | 0.66 ± 0.0005 |
| VDM-N | 3.68 ± 0.002 | −2.74 | 0.79 ± 0.0003 |
| VDM-MC + δ | 3.17 ± 0.001 | −3.21 | 0.70 ± 0.0008 |
| VDM-SCA + CAT | 3.09 ± 0.001 | −3.24 | 0.64 ± 0.0005 |
| VDM-SCA + δ | 2.88 ± 0.002 | −3.68 | 0.58 ± 0.0008 |
| VDM (full) | 2.85 ± 0.002 | −3.62 | 0.57 ± 0.0005 |

As shown in Table 2, the VDM presented in this specification outperforms all other sequential models in the Taxi Trajectory training. Compared with, for example, CF-VAE, the VDM approach does not emphasise the role of given observations. Sequence forecasting using VDM depends on the latest state, and the impact of initial observations becomes progressively weaker while the forecasting proceeds. This accords with the driving behaviour. The result of this is that only a few of the predictions match the direction of the ground truth, while many of them are still plausible, but far away from the ground truth. Quantitatively, the smallest Wasserstein distance achieved by VDM also proves that the forecasts using VDM of taxi trajectories are diverse and accurate. Although the above results have been presented in respect of a taxi trajectory prediction challenge, a skilled person will appreciate that many sequential observation prediction tasks can benefit from the VDM approach.

Figure 5:
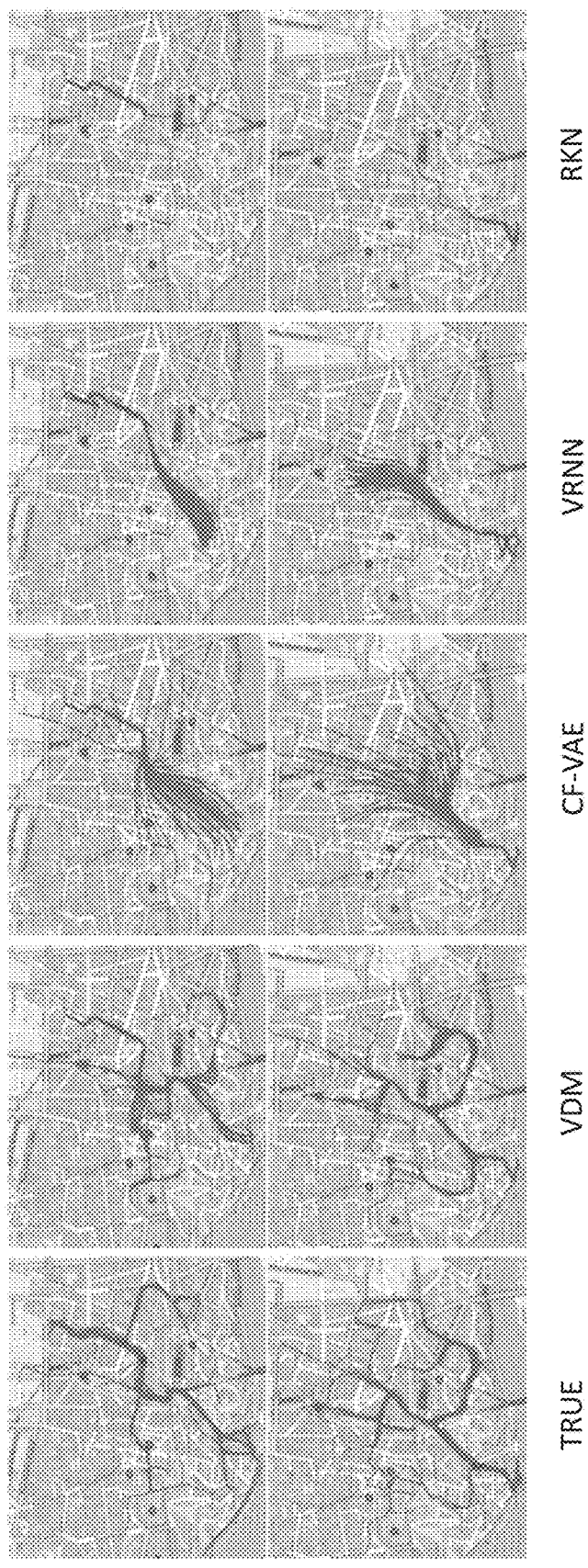
FIG. 5 provides true samples and results from different models for taxi trajectory forecasting, in accordance with an example embodiment of the present invention.

FIG. 5 illustrates the results of the computer-implemented method according to the first aspect as applied to predicted taxi trajectories in Porto starting from two different locations. Results row "A" illustrates taxi trajectories starting from a location in the top-right hand side of the map. Results row "B" illustrates taxi trajectories starting from a location in the bottom-left hand corner of the map. In both cases "A" and "B", the "TRUE" grids represent the ground truth samples. The "VAE" grids represent initial observations, and their continuations, predicted by the VDM technique introduced in the present specification. The "CF-VAE" grids represent initial observations, and their continuations, predicted by the comparative CF-VAE algorithm. The "VRNN" grids represent initial observations, and their continuations, predicted by the comparative VRNN algorithm. The "RKN" grids represent initial observations, and their continuations, predicted by the comparative "RKN" algorithm. In each case in set of observations "A", the initial observations for each of the "TRUE", "VDM", "CF-VAE", "VRNN", and "RKN" are identical. Similarly, In each case in set of observations "B", the initial observations for each of the "TRUE", "VDM", "CF-VAE", "VRNN", and "RKN" are identical.

Comparing taxi trajectory prediction techniques with the ground truth, it can qualitatively be concluded that the VDM technique predicts a plurality of taxi trajectory continuations, starting from a given initial trajectory, with a high degree of fidelity to the true data. The CF-VAE and VRNN algorithms, when provided with the same training data and initial trajectories, show a tendency towards generating non-geographically plausible routes. In other words, the CF-VAE and VRNN algorithms generate trajectory continuations that do not capture the multi-modality inherent in following a street plan. This tendency is worse in the VRNN algorithm. The RKN algorithm appears to be so badly conditioned that significant trajectory continuations are not generated.

Although the above results have been discussed in terms of a scenario for generating trajectory continuations of a taxi on a street map, a skilled person will appreciate that the VDM approach may generically be applied to any sequence of observation vectors, and may provide enhanced performance when the sequence of observation vectors is generated subject to multi-modal biases.

What is claimed is:

1. A computer-implemented method for training a deep state space model using machine learning, the deep state space model including a generative model and a multi-modal inference model, wherein the generative model includes a transition model configured to describe a change of a plurality of latent states, and an emission model configured to decode the plurality of latent states to provide a plurality of synthetic observations, the method comprising the following steps:
 a) receiving a training data set including a sequence of observation vectors each obtained at an observation step;
 for each of a plurality of observation vectors in the sequence of observation vectors, iterating b), c) and d):
 b) inferring, using the multi-modal inference model, a current latent state of the generative model by mapping a current observation vector obtained at a current observation step of the sequence of observation vectors to obtain a probability distribution of the current latent state,
 c) constructing, using the multi-modal inference model, a posterior approximation of the current latent state as a mixture density network, to yield a plurality of approximated latent state vectors,
 d) decoding, using the emission model, the plurality of approximated latent state vectors to provide a plurality of synthetic observations;

e) outputting the trained deep state space model; and
f) providing a controller configured to control, based on the trained deep state space model, one of a physical operation of a vehicle, a robot or industrial machine, or a frequency subcarrier allocation of a wireless network,
wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

2. The computer-implemented method according to claim 1, further comprising:
iteratively optimizing parameters of the generative model and the multi-modal inference model by comparing the sequence of observation vectors of the training data set to the plurality of synthetic observations according to an objective function calculated for each iteration.

3. The computer-implemented method according to claim 2, wherein the objective function is an evidence lower bound (ELBO).

4. The computer-implemented method according to claim 2, wherein the objective function further includes a first regularization term based on an approximation of a log evidence.

5. The computer-implemented method according to claim 2, wherein the objective function further includes a second regularization term based on an adversarial function.

6. The computer-implemented method according to claim 1, wherein the posterior approximation is sampled using Monte-Carlo sampling or randomized quasi Monte-Carlo sampling.

7. The computer-implemented method according to claim 6, wherein a weighting function is applied to samples of the posterior approximation at each time step.

8. A computer-implemented method for training a deep state space model using machine learning, the deep state space model including a generative model and a multi-modal inference model, wherein the generative model includes a transition model configured to describe a change of a plurality of latent states, and an emission model configured to decode the plurality of latent states to provide a plurality of synthetic observations, the method comprising the following steps:
a) receiving a training data set including a sequence of observation vectors each obtained at an observation step;
for each of a plurality of observation vectors in the sequence of observation vectors, iterating b), c) and d):
b) inferring, using the multi-modal inference model, a current latent state of the generative model by mapping a current observation vector obtained at a current observation step of the sequence of observation vectors to obtain a probability distribution of the current latent state,
c) constructing, using the multi-modal inference model, a posterior approximation of the current latent state as a mixture density network, to yield a plurality of approximated latent state vectors,
d) decoding, using the emission model, the plurality of approximated latent state vectors to provide a plurality of synthetic observations;

e) outputting the trained deep state space model; and
f) providing a controller configured to control, based on the trained deep state space model, one of a physical operation of a vehicle, a robot or industrial machine, or a frequency subcarrier allocation of a wireless network,
wherein the posterior approximation is sampled using Monte-Carlo sampling or randomized quasi Monte-Carlo sampling, wherein a weighting function is applied to samples of the posterior approximation at each time step, and
wherein the weighting function is (i) an indicator function is sampled from a categorical distribution, or (ii) the weighting function includes a non-zero component that is selected to achieve a highest likelihood.

9. The computer-implemented method according to claim 1, wherein a transition network and/or mixture components are parameterized by a gated recurrent unit (GRU).

10. The computer-implemented method according to claim 1, wherein the transition model is non-Markovian.

11. The computer-implemented method according to claim 1, wherein the training data set includes a first sequence of observation vectors defining a time series training sequence.

12. A computer-implemented method for using a trained machine learning model in a predictive system, comprising the following steps:
receiving a trained deep state space model, the deep state space model including a generative model and a multi-modal inference model, wherein the generative model includes a transition model configured to describe a change of a plurality of latent states, and an emission model configured to decode the plurality of latent states to provide a plurality of synthetic observations, the deep state space model being trained by:
a) receiving a training data set including a sequence of observation vectors each obtained at an observation step;
for each of a plurality of observation vectors in the sequence of observation vectors, iterating b), c) and d):
b) inferring, using the multi-modal inference model, a current latent state of the generative model by mapping a current observation vector obtained at a current observation step of the sequence of observation vectors to obtain a probability distribution of the current latent state,
c) constructing, using the multi-modal inference model, a posterior approximation of the current latent state as a mixture density network, to yield a plurality of approximated latent state vectors,
d) decoding, using the emission model, the plurality of approximated latent state vectors to provide a plurality of synthetic observations; and
e) outputting the trained deep state space model;
receiving an input sequence of observation vectors each obtained at an observation step;
predicting at least one continuation of the input sequence of observation vectors, using the trained deep state space model, wherein the continuation includes a synthetic observation obtained from the trained deep state space model;
outputting the at least one continuation of the input sequence of observation vectors; and
providing a controller configured to control, based on the trained deep state space model, one of a physical operation of a vehicle, a robot or industrial machine, or a frequency subcarrier allocation of a wireless network, wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

13. The computer-implemented method for using a trained machine learning model according to claim 12, wherein the input sequence of observation vectors is a time series, representing one or more of:
- a sequence of image data or audio data; or
- a sequence of data for monitoring an operator; or
- a sequence of data received from the industrial machine, or
- a sequence of data representing historical vehicle routing or engine performance, or
- a sequence of data describing wireless network performance or wireless network resource allocation.

14. An apparatus configured to train a deep state space model using machine learning, comprising:
an input interface;
a memory;
a processor; and
an output interface;
wherein the input interface is configured to receive a training data set including a sequence of observation vectors each obtained at an observation step;
wherein the processor is configured to execute a deep state space model including a generative model and a multi-modal inference model, wherein, in use, the generative model further includes a transition model configured to describe a change of a plurality of latent states, and an emission model configured to decode the plurality of latent states to provide thereby a plurality of synthetic observations;
wherein the processor is further configured, for a plurality of observation vectors comprised in the sequence of observation vectors, to iterate (a) inference, using the multi-modal inference model, of a current latent state of the generative model by mapping a current observation vector obtained at a current observation step of the sequence of observation vectors to obtain a probability distribution of the current latent state, and (b) construction, using the multi-modal inference model, of a posterior approximation of the current latent state as a mixture density network, to yield a plurality of approximated latent state vectors, and for a plurality of observation vectors in the sequence of observation vectors, the processor is configured to decode, using the emission model, the plurality of approximated latent state vectors to provide thereby a plurality of synthetic observations;
wherein the output interface is configured to output the trained deep state space model;
wherein one of a physical operation of a vehicle, a robot or industrial machine, or a frequency subcarrier allocation of a wireless network is controlled based on the trained deep state space model; and
wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

15. A non-transitory computer readable medium on which is stored a computer program element including a program for training a deep state space model using machine learning, the deep state space model including a generative model and a multi-modal inference model, wherein the generative model includes a transition model configured to describe a change of a plurality of latent states, and an emission model configured to decode the plurality of latent states to provide a plurality of synthetic observations, the program, when executed by a computer, causing the computer to perform the following steps:
a) receiving a training data set including a sequence of observation vectors each obtained at an observation step;
for each of a plurality of observation vectors in the sequence of observation vectors, iterating b), c) and d):
b) inferring, using the multi-modal inference model, a current latent state of the generative model by mapping a current observation vector obtained at a current observation step of the sequence of observation vectors to obtain a probability distribution of the current latent state,
c) constructing, using the multi-modal inference model, a posterior approximation of the current latent state as a mixture density network, to yield a plurality of approximated latent state vectors,
d) decoding, using the emission model, the plurality of approximated latent state vectors to provide a plurality of synthetic observations; and
e) outputting the trained deep state space model,
wherein one of a physical operation of a vehicle, a robot or industrial machine, or a frequency subcarrier allocation of a wireless network is controlled based on the trained deep state space model, and
wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

16. A non-transitory computer readable medium on which is stored a computer program element including trained model data defining a deep state space model, the deep state model including a generative model and a multi-modal inference model, wherein the generative model includes a transition model configured to describe a change of a plurality of latent states, and an emission model configured to decode the plurality of latent states to provide a plurality of synthetic observations, the trained model data being generated by a computer performing the following steps:
a) receiving a training data set including a sequence of observation vectors each obtained at an observation step;
for each of a plurality of observation vectors in the sequence of observation vectors, iterating b), c) and d):

b) inferring, using the multi-modal inference model, a current latent state of the generative model by mapping a current observation vector obtained at a current observation step of the sequence of observation vectors to obtain a probability distribution of the current latent state, c) constructing, using the multi-modal inference model, a posterior approximation of the current latent state as a mixture density network, to yield a plurality of approximated latent state vectors, d) decoding, using the emission model, the plurality of approximated latent state vectors to provide a plurality of synthetic observations; and e) outputting the trained deep state space model, wherein one of a physical operation of a vehicle, a robot or industrial machine, or a frequency subcarrier allocation of a wireless network is controlled based on the trained deep state space model, and wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

17. A vehicle, comprising:

a controller configured, at least partially, using a deep state space model, the deep state space model including a generative model and a multi-modal inference model, wherein the generative model includes a transition model configured to describe a change of a plurality of latent states, and an emission model configured to decode the plurality of latent states to provide a plurality of synthetic observations, the deep state space model being trained by:

a) receiving a training data set including a sequence of observation vectors each obtained at an observation step;

for each of a plurality of observation vectors in the sequence of observation vectors, iterating b), c) and d):

b) inferring, using the multi-modal inference model, a current latent state of the generative model by mapping a current observation vector obtained at a current observation step of the sequence of observation vectors to obtain a probability distribution of the current latent state, c) constructing, using the multi-modal inference model, a posterior approximation of the current latent state as a mixture density network, to yield a plurality of approximated latent state vectors, d) decoding, using the emission model, the plurality of approximated latent state vectors to provide a plurality of synthetic observations; and e) outputting the trained deep state space model;

wherein the training data set includes a sequence of observation vectors describing one or more of: battery state of health, or an external traffic, or a route model, or a driver behaviour model, or an engine model, wherein a physical operation of the vehicle is controlled based on the trained deep state space model, and wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

18. A wireless base station and/or handset, comprising:

a controller configured, at least partially, using a deep state space model, the deep state space model including a generative model and a multi-modal inference model, wherein the generative model includes a transition model configured to describe a change of a plurality of latent states, and an emission model configured to decode the plurality of latent states to provide a plurality of synthetic observations, the deep state space model being trained by:

a) receiving a training data set including a sequence of observation vectors each obtained at an observation step;

for each of a plurality of observation vectors in the sequence of observation vectors, iterating b), c) and d):

b) inferring, using the multi-modal inference model, a current latent state of the generative model by mapping a current observation vector obtained at a current observation step of the sequence of observation vectors to obtain a probability distribution of the current latent state, c) constructing, using the multi-modal inference model, a posterior approximation of the current latent state as a mixture density network, to yield a plurality of approximated latent state vectors, d) decoding, using the emission model, the plurality of approximated latent state vectors to provide a plurality of synthetic observations; and e) outputting the trained deep state space model;

wherein the training data set includes a sequence of observation vectors describing one or more of: data demand at a plurality of network nodes, or attainable uplink or downlink rate relative to geographical position of a handset, or physical layer parameters including MIMO antenna configurations, OFDM subcarrier configuration, QAM index, channel coding modes, channel response between downlink and uplink, or a HARQ configuration, wherein a frequency subcarrier allocation of the wireless base station and/or handset is controlled based on the trained deep state space model, and wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

19. An industrial machine or robot, comprising:

a controller configured, at least partially, using a deep state space model, the deep state space model including a generative model and a multi-modal inference model, wherein the generative model includes a transition model configured to describe a change of a plurality of latent states, and an emission model configured to decode the plurality of latent states to provide a plurality of synthetic observations, the deep state space model being trained by:
a) receiving a training data set including a sequence of observation vectors each obtained at an observation step;
for each of a plurality of observation vectors in the sequence of observation vectors, iterating b), c) and d):
  b) inferring, using the multi-modal inference model, a current latent state of the generative model by mapping a current observation vector obtained at a current observation step of the sequence of observation vectors to obtain a probability distribution of the current latent state,
  c) constructing, using the multi-modal inference model, a posterior approximation of the current latent state as a mixture density network, to yield a plurality of approximated latent state vectors,
  d) decoding, using the emission model, the plurality of approximated latent state vectors to provide a plurality of synthetic observations; and
e) outputting the trained deep state space model;
wherein the training data set includes a sequence of observation vectors describing one or more of: position of a portion of the machine or robot, or an operating temperature, or a vibration measure, or a sound or video measurement,
wherein a physical operation of the industrial machine or the robot is controlled based on the trained deep state space model, and
wherein constructing the posterior approximation of the current latent state as a mixture density network includes: sampling the posterior approximation from a previous observation step according to a stochastic cubature approximation, and wherein the stochastic cubature approximation is generated by constructing 2n+1 unit sigma points optimally distributed on an n-dimensional standard Gaussian, wherein the sigma points are samples having the same mean and covariance as the latent state corresponding to the observation step.

* * * * *